US009534517B2

(12) United States Patent
Styles et al.

(10) Patent No.: US 9,534,517 B2
(45) Date of Patent: Jan. 3, 2017

(54) SYSTEMS AND METHODS FOR A MODIFIED CYLINDER FIRING INTERVAL IN A DEDICATED EGR ENGINE

(71) Applicant: Ford Global Technologies, LLC, Dearborn, MI (US)

(72) Inventors: Daniel Joseph Styles, Canton, MI (US); Brad Alan Boyer, Canton, MI (US); Gregory Patrick McConville, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 163 days.

(21) Appl. No.: 14/458,201

(22) Filed: Aug. 12, 2014

(65) Prior Publication Data

US 2016/0047341 A1 Feb. 18, 2016

(51) Int. Cl.
 *F01L 13/00* (2006.01)
 *F02M 25/07* (2006.01)
 *F02D 13/02* (2006.01)
 *F02D 23/00* (2006.01)
 *F02D 41/00* (2006.01)

(52) U.S. Cl.
 CPC .......... *F01L 13/00* (2013.01); *F02D 13/0276* (2013.01); *F02D 41/0007* (2013.01); *F02D 41/008* (2013.01); *F02D 41/0065* (2013.01); *F02M 25/0704* (2013.01); *F02M 25/077* (2013.01); *F02M 25/0717* (2013.01); *F02M 25/0749* (2013.01); *F02M 26/43* (2016.02); *F02D 23/00* (2013.01); *F02D 41/006* (2013.01); *F02D 2041/001* (2013.01); *Y02T 10/121* (2013.01); *Y02T 10/144* (2013.01)

(58) Field of Classification Search
 CPC .......... F01L 13/00; F02D 23/00; F02M 26/52; F02M 26/43; F02M 26/02; F02M 26/14
 USPC .............................. 123/90.15, 90.23, 568.11, 568.13, 123/568.14, 568.17, 568.21
 See application file for complete search history.

(56) References Cited

U.S. PATENT DOCUMENTS

| 4,179,892 A | 12/1979 | Heydrich |
| 4,565,167 A * | 1/1986 | Bryant ................... F02B 33/22 123/560 |

(Continued)

OTHER PUBLICATIONS

Flierl, Rudolf et al., "Turbocharged Three-cylinder Engine with Activation of a Cylinder," MTZ Motortechnische Zeitschrift, vol. 75, Iss. 6, pp. 22-27, Jun. 1, 2014, 6 pages.

(Continued)

*Primary Examiner* — Joseph Dallo
(74) *Attorney, Agent, or Firm* — Julia Voutyras; Alleman Hall McCoy Russell & Tuttle LLP

(57) ABSTRACT

Methods and systems are provided for operating exhaust valves of an engine to create more even exhaust pulses to a turbine. More specifically, the engine may include one or more dedicated exhaust gas recirculation (EGR) cylinders routing exhaust to an engine intake and one or more non-dedicated EGR cylinder routing exhaust to the turbine. In one example, a method may include operating a first set of exhaust valves of a group of non-dedicated EGR cylinders to have no exhaust valve opening overlap and operating an exhaust valve of a dedicated EGR cylinder so that opening of the second exhaust valve overlaps with opening of exhaust valves of two cylinders of the group of non-dedicated EGR cylinders.

20 Claims, 7 Drawing Sheets

(56) References Cited

U.S. PATENT DOCUMENTS

| | | | | |
|---|---|---|---|---|
| 5,626,117 | A * | 5/1997 | Wright | F02D 41/0255 123/406.55 |
| 6,138,650 | A | 10/2000 | Bailey | |
| 6,386,154 | B1 * | 5/2002 | Hellman | F02D 13/0276 123/568.12 |
| 6,543,230 | B1 | 4/2003 | Schmid | |
| 6,600,989 | B2 * | 7/2003 | Sellnau | F01L 1/34 123/90.15 |
| 6,662,781 | B1 * | 12/2003 | Torno | F02D 41/222 123/406.16 |
| 6,760,656 | B2 * | 7/2004 | Matthews | F02D 41/0087 123/480 |
| 7,032,581 | B2 * | 4/2006 | Gibson | F02D 13/0207 123/673 |
| 7,059,997 | B2 * | 6/2006 | Nishizawa | B60W 10/06 477/107 |
| 7,063,059 | B2 * | 6/2006 | Calderwood | F02D 13/0215 123/146.5 A |
| 7,277,789 | B1 * | 10/2007 | Gibson | B60T 17/22 701/104 |
| 7,284,514 | B2 * | 10/2007 | Grider | F02D 13/0253 123/90.11 |
| 7,751,963 | B2 * | 7/2010 | Gecim | F16F 15/027 123/192.1 |
| 7,891,332 | B2 * | 2/2011 | Shin | F02D 41/009 123/192.1 |
| 7,913,669 | B2 * | 3/2011 | Luken | F02D 17/02 123/481 |
| 8,145,410 | B2 * | 3/2012 | Berger | B60K 6/365 701/111 |
| 8,176,891 | B2 * | 5/2012 | Choi | F02D 17/02 123/197.4 |
| 8,210,148 | B2 * | 7/2012 | Morgan | F02B 75/06 123/192.1 |
| 8,291,891 | B2 | 10/2012 | Alger, II et al. | |
| 8,347,849 | B2 * | 1/2013 | Wermuth | F02B 1/06 123/295 |
| 8,375,904 | B2 * | 2/2013 | Gustafson | F01L 1/08 123/348 |
| 8,474,432 | B2 * | 7/2013 | Storhok | F02D 41/064 123/299 |
| 8,539,768 | B2 | 9/2013 | Hayman et al. | |
| 8,561,599 | B2 | 10/2013 | Gingrich et al. | |
| 8,671,920 | B2 | 3/2014 | Hayman et al. | |
| 2005/0016496 | A1 * | 1/2005 | Hitomi | F01L 1/053 123/305 |
| 2005/0022755 | A1 * | 2/2005 | Hitomi | F01L 1/185 123/58.8 |
| 2009/0308070 | A1 | 12/2009 | Alger, II et al. | |
| 2011/0226220 | A1 * | 9/2011 | Wilkins | F02B 75/044 123/48 B |
| 2012/0042649 | A1 * | 2/2012 | Kaneko | F01L 1/08 60/614 |
| 2012/0116647 | A1 * | 5/2012 | Pochner | F02D 17/02 701/102 |
| 2012/0204827 | A1 * | 8/2012 | Sieber | F02D 41/0087 123/179.4 |
| 2012/0204844 | A1 | 8/2012 | Gingrich et al. | |
| 2012/0216530 | A1 | 8/2012 | Flynn et al. | |
| 2012/0222659 | A1 | 9/2012 | Kulkarni et al. | |
| 2012/0260894 | A1 | 10/2012 | Hayman | |
| 2012/0285163 | A1 | 11/2012 | Hayman et al. | |
| 2012/0298070 | A1 | 11/2012 | Akinyemi et al. | |
| 2012/0323470 | A1 | 12/2012 | Klingbeil et al. | |
| 2013/0167793 | A1 | 7/2013 | Roehrig | |
| 2013/0220286 | A1 | 8/2013 | Gingrich et al. | |
| 2013/0291816 | A1 * | 11/2013 | Serrano | F01L 1/344 123/90.17 |
| 2013/0311068 | A1 | 11/2013 | Rollinger et al. | |
| 2014/0150746 | A1 | 6/2014 | Valencia et al. | |

OTHER PUBLICATIONS

Leone, Thomas G. et al., "Systems and Methods for Dedicated EGR Cylinder Valve Control," U.S. Appl. No. 14/297,232, filed Jun. 5, 2014, 36 pages.

Leone, Thomas G. et al., "Systems and Methods for EGR Control," U.S. Appl. No. 14/298,733, filed Jun. 6, 2014, 45 pages.

Boyer, Brad A. et al., "Method for a Variable Displacement Engine," U.S. Appl. No. 14/445,830, filed Jul. 29, 2014, 93 pages.

Boyer, Brad A. et al., "Twin Scroll Turbocharger in a Variable Displacement Engine," U.S. Appl. No. 14/445,876, filed Jul. 29, 2014, 93 pages.

Boyer, Brad A. et al., "Variable Displacement Engine Control," U.S. Appl. No. 14/445,919, filed Jul. 29, 2014, 93 pages.

Alger, Terry et al., "Dedicated EGR: A New Concept in High Efficiency Engines," SAE Technical Paper Series No. 2009-01-0694, Southwest Research Institute, 12 pages.

* cited by examiner

SYSTEMS AND METHODS FOR A MODIFIED CYLINDER FIRING INTERVAL IN A DEDICATED EGR ENGINE

FIELD

The present description relates generally to methods and systems for more evenly distributing exhaust pulses to a turbocharger turbine in engine systems configured with a dedicated cylinder group for providing external EGR to engine cylinders.

BACKGROUND/SUMMARY

Engines may be configured with exhaust gas recirculation (EGR) systems to divert at least some exhaust gas from an engine exhaust manifold to an engine intake manifold. By providing a desired engine dilution, such systems reduce engine knock, throttling losses, in-cylinder heat losses, as well as NOx emissions. As a result, fuel economy is improved, especially at higher levels of engine boost. Engines have also been configured with a sole cylinder (or cylinder group) that is dedicated for providing external EGR to the engine cylinders. Therein, all of the exhaust from the dedicated cylinder group is recirculated to the intake manifold. As such, this allows a substantially fixed amount of EGR to be provided to engine cylinders at most operating conditions. By adjusting the fueling of the dedicated EGR cylinder group (e.g., to run rich), the EGR composition can be varied to include species such as hydrogen which improve the EGR tolerance of the engine and result in fuel economy benefits.

Various approaches may be used to time the firing of one or more dedicated EGR cylinder with non-dedicated EGR cylinders. In one example, the firing of the non-dedicated EGR cylinders may be distributed unevenly due to the firing of the dedicated EGR cylinder(s). For example, US patent publication no. 2012/0216530 shows firing a dedicated EGR cylinder between successive firing of three non-dedicated EGR cylinders. Additionally, all cylinders, including the dedicated EGR cylinders, fire at the same number of crank degrees after the previously fired cylinder. However, the inventors herein have recognized problems with this approach. For example, firing non-dedicated EGR cylinders and dedicated EGR cylinders with a conventional cylinder firing interval results in uneven exhaust pulses being delivered to the turbine. Further, a period may occur, during the firing of the dedicated EGR cylinder, where no exhaust flows to the turbine. Uneven exhaust blowdown pulses at the turbine may result in reduced engine performance and/or compressor surge events. Further still, in some examples, exhaust valve overlap between two or more cylinders routing exhaust to the turbine may result in exhaust blowdown interference at the turbine, thereby increasing in-cylinder pressures and decreasing engine efficiency.

In one example, the issues described above may be addressed by a method for operating a first set of exhaust valves of a first group of cylinders to have no exhaust valve opening overlap and operating one or more second exhaust valves of a dedicated EGR cylinder routing exhaust to an intake manifold so that opening of the one or more second exhaust valves overlaps with opening of exhaust valves of two cylinders of the first group of cylinders. In this way, exhaust blowdown interference between the first group of cylinders may be decreased and exhaust pulses to the turbine may be more evenly spaced.

For example, the first group of cylinders may be a group of non-dedicated EGR cylinders routing exhaust via the first set of exhaust valves to a turbine while the dedicated EGR cylinder is the only cylinder routing exhaust to the intake manifold. By operating the non-dedicated EGR cylinders to have no exhaust valve overlap via changing the firing interval of those cylinders, exhaust valves of different cylinders for the first group of cylinders may not be open at the same time. Further, by overlapping opening of the exhaust valve of the dedicated EGR cylinder with two exhaust valve opening events of two of the non-dedicated EGR cylinders, exhaust may continue to flow to the turbine even while the exhaust valve of the dedicated EGR cylinder is open. In this way, the exhaust pulses to the turbine may be spaced more evenly without periods of no exhaust flow to the turbine. Additionally, exhaust exiting the exhaust valves of the non-dedicated EGR cylinders may not interfere with exhaust exiting the other exhaust valves of the non-dedicated EGR cylinders, thereby increasing engine efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
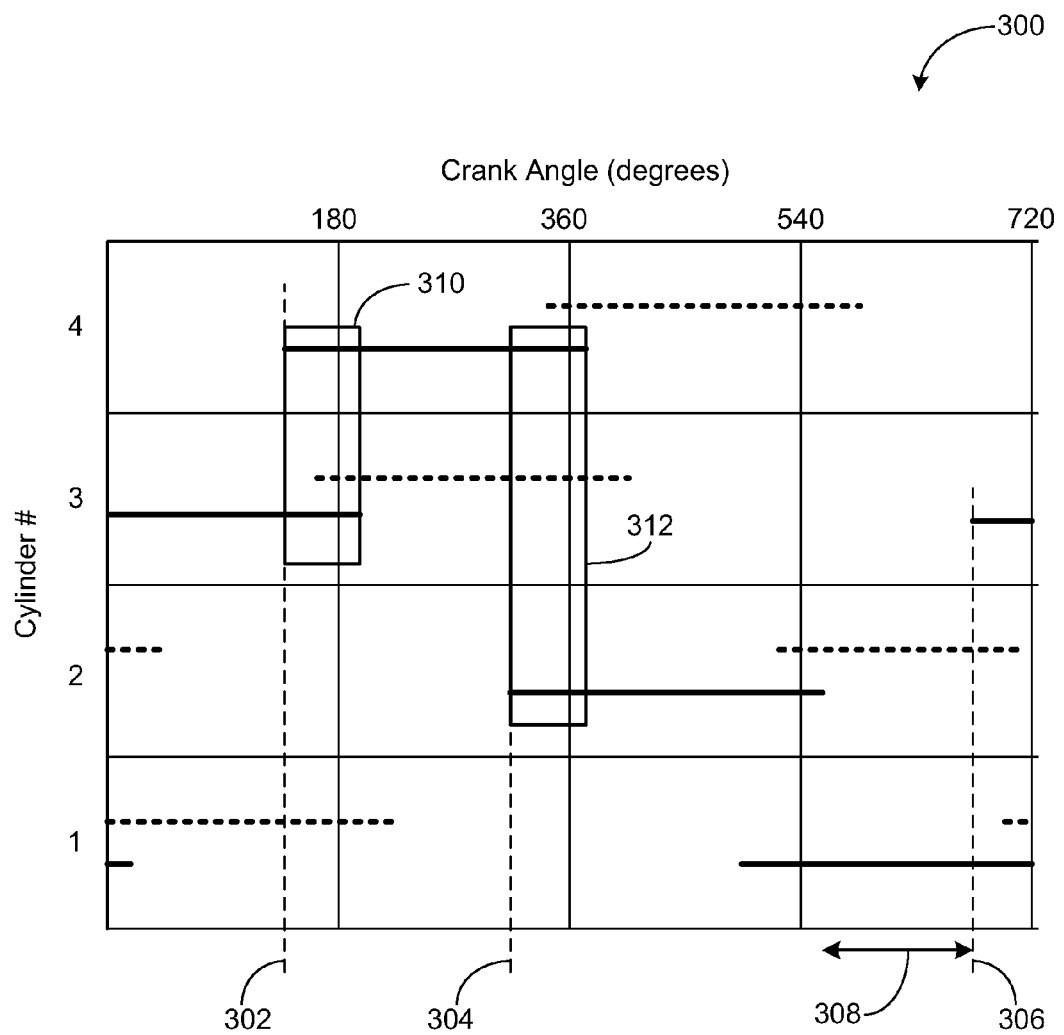
FIGS. 3-4 show cylinder firing interval graphs for a four-cylinder engine including a dedicated EGR cylinder.
Figure 4:
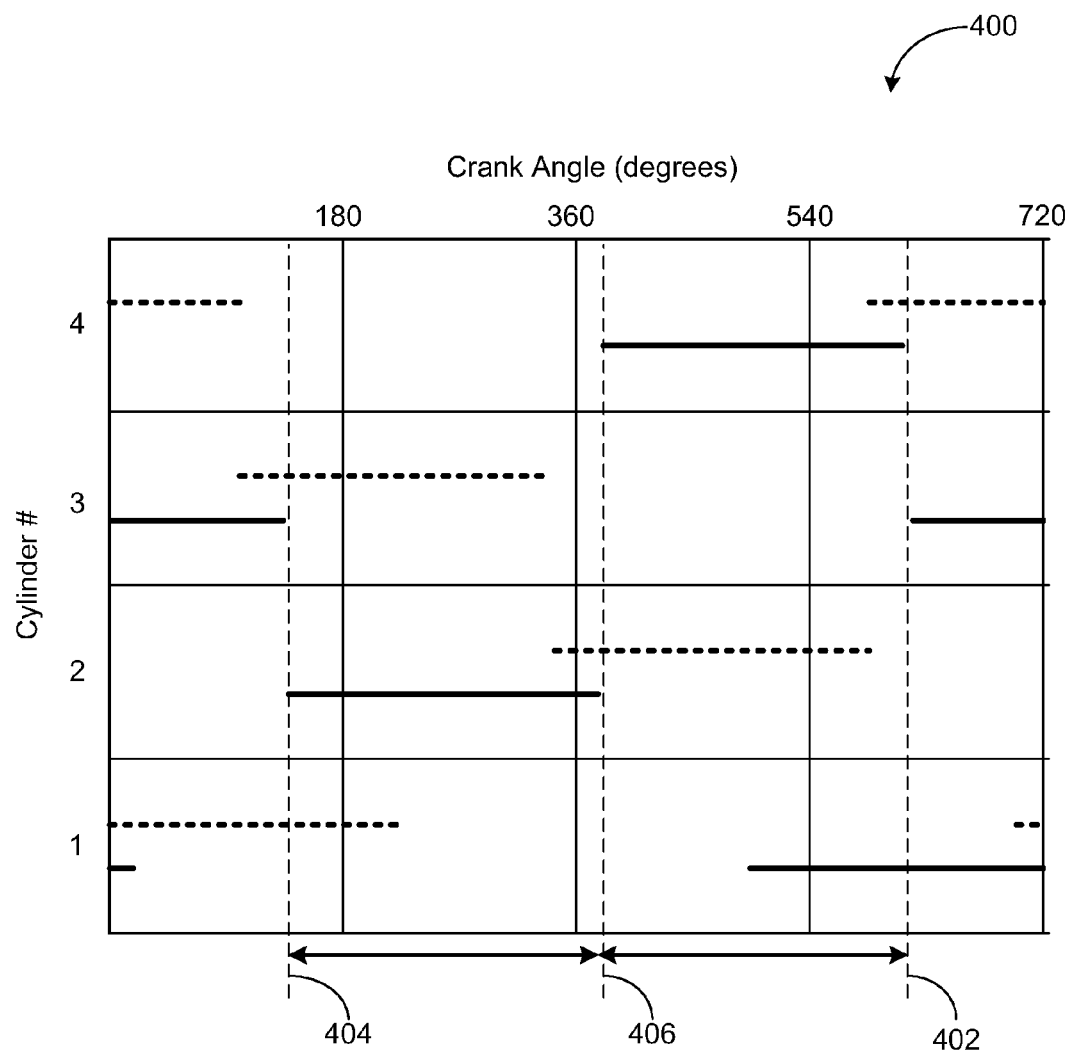
Figure 6:
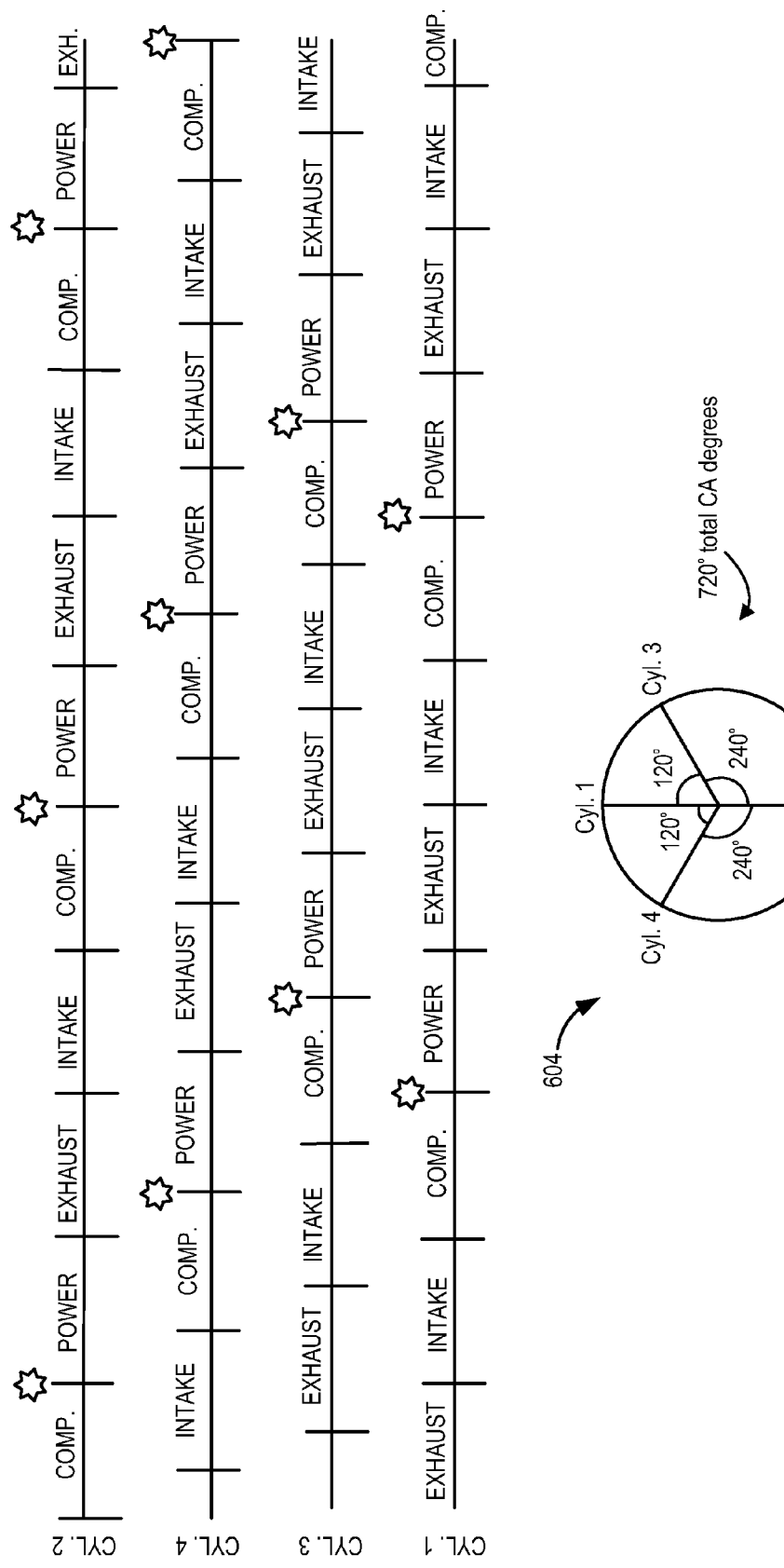
FIG. 6 shows a spark timing diagram in accordance with the present disclosure.
Figure 7:
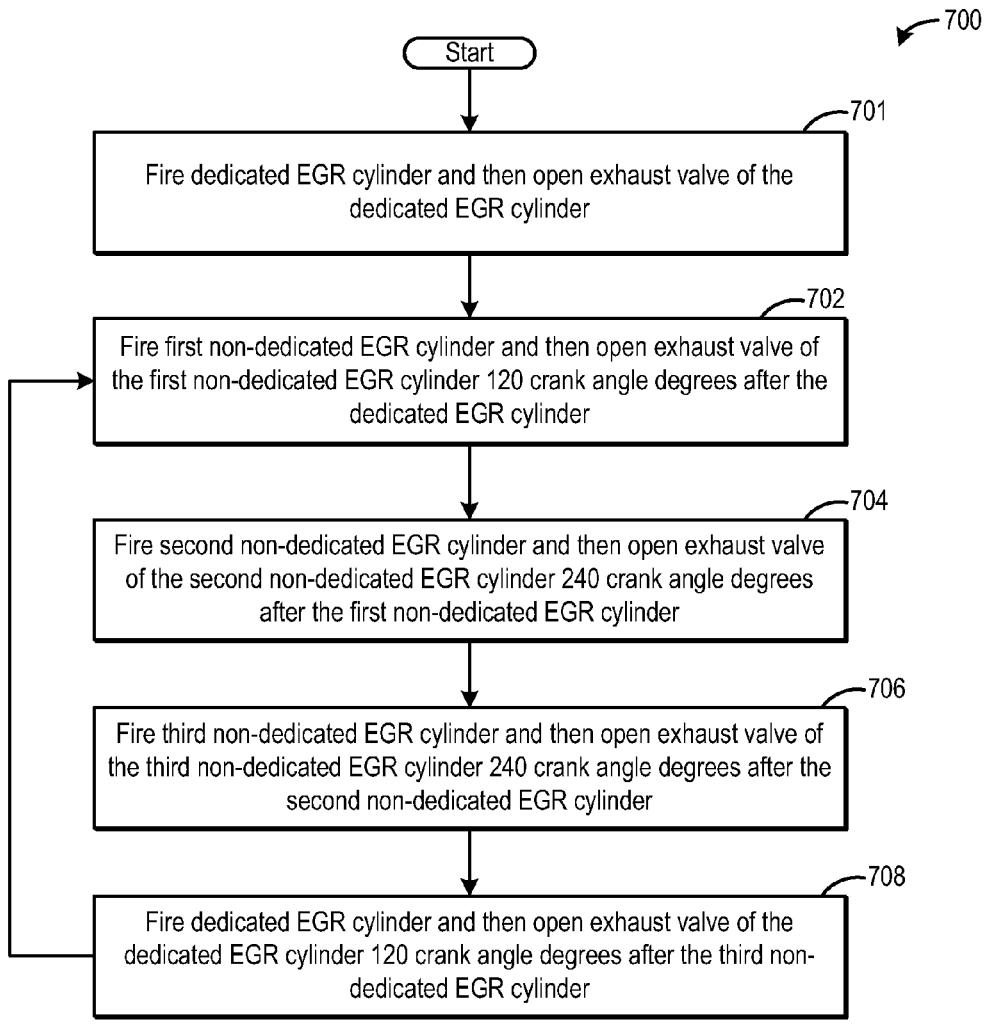
FIG. 7 is a flow chart of a method for firing engine cylinders with a specified timing.

The following description relates to systems and methods for operating exhaust valves of an engine to create more even exhaust pulses to a turbine. In one example, an engine, such as the engine shown in FIGS. 1-2, may include one or more dedicated exhaust gas recirculation (EGR) cylinders that route exhaust gas to an engine intake or intake manifold. The engine may also include a plurality of non-dedicated EGR cylinders that route exhaust exclusively to a turbine and exhaust and not to the intake manifold. In some examples, as shown at FIG. 3, the engine may have a firing interval resulting in uneven exhaust pulses (including no exhaust pulses) at the turbine, thereby reducing engine performance and/or increasing compressor surge events. Additionally, exhaust valve overlap may occur between non-dedicated EGR cylinders, thereby causing increased blowdown pulse interference. Blowdown interference can affect the exhaust stroke pumping work and the exhaust pressure during overlap, which in turn affects the residual fraction in the overlapping cylinders. Thus, as shown at FIG. 4, a firing interval and exhaust valve overlap of engine cylinders may be adjusted to reduce blowdown pulse interference and create more even exhaust pulses at the turbine. In one example, the firing interval and reduced exhaust valve overlap shown at FIG. 4 may be produced by a crankshaft design, such as the crankshaft shown in FIG. 5. FIG. 6 further illustrates the spark timing and cylinder firing order produced by the crankshaft of FIG. 5. Additionally, FIG. 7 shows a method for operating exhaust valves and firing the engine cylinders as depicted in FIG. 4.

Figure 1:
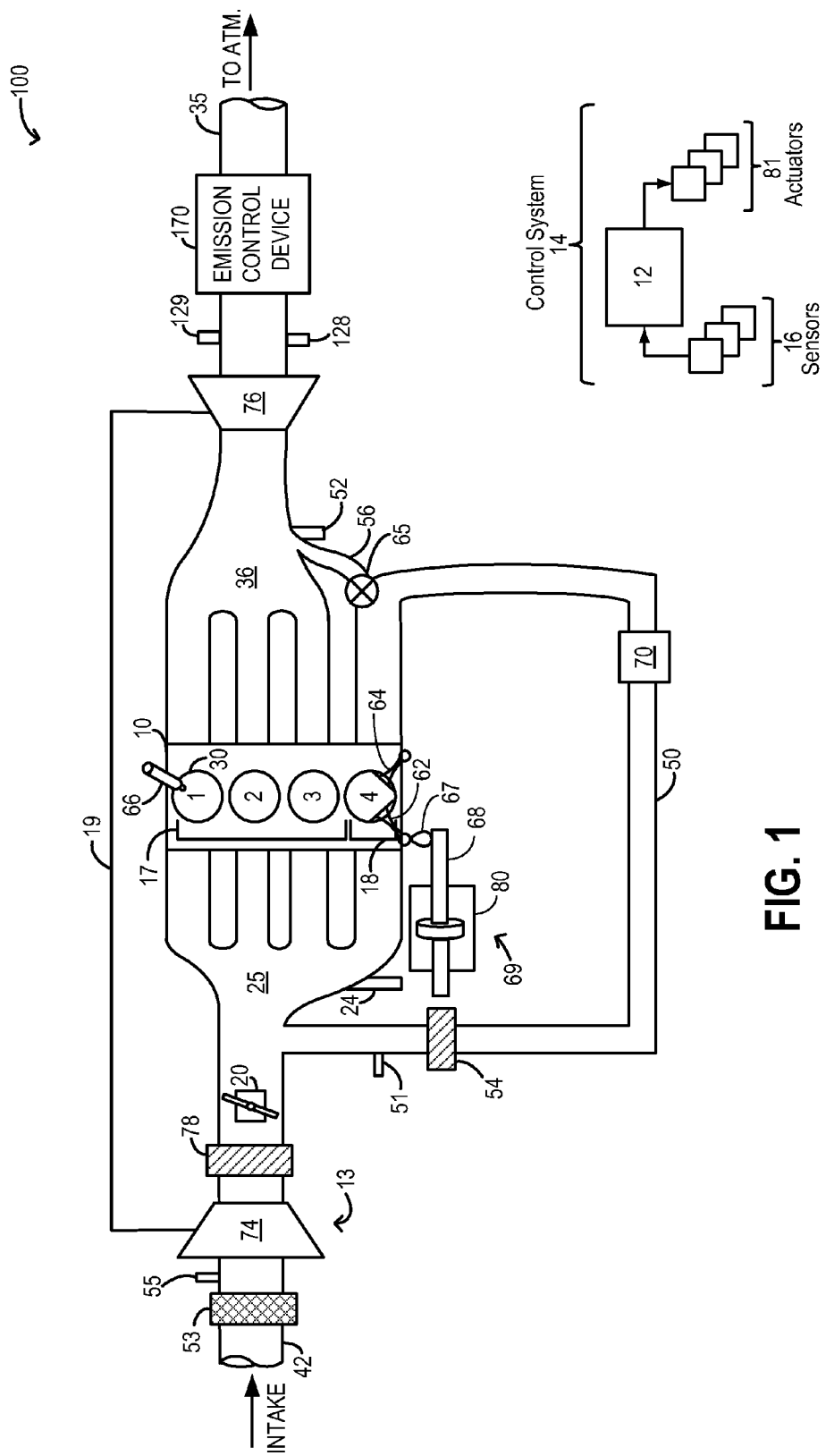
FIG. 1 is a schematic diagram of an engine system including a dedicated EGR donating cylinder group.

FIG. 1 schematically shows aspects of an example engine system 100 including an engine 10 with four cylinders (1-4). As elaborated herein, the four cylinders are arranged as a first cylinder group 17 consisting of non-dedicated EGR cylinders 1-3 and a second cylinder group 18 consisting of dedicated EGR cylinder 4. A detailed description of each combustion chamber of engine 10 is provided with reference to FIG. 2. Engine system 100 may be coupled in a vehicle, such as a passenger vehicle configured for road travel.

In the depicted embodiment, engine 10 is a boosted engine coupled to a turbocharger 13 including a compressor 74 driven by a turbine 76. Specifically, fresh air is introduced along intake passage 42 into engine 10 via air cleaner 53 and flows to compressor 74. A flow rate of ambient air that enters the intake system through intake air passage 42 can be controlled at least in part by adjusting intake throttle 20. Compressor 74 may be any suitable intake-air compressor, such as a motor-driven or driveshaft driven supercharger compressor. In engine system 10, however, the compressor is a turbocharger compressor mechanically coupled to turbine 76 via a shaft 19, the turbine 76 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 74 is coupled, through charge-air cooler 78 to intake throttle 20. Intake throttle 20 is coupled to engine intake manifold 25. From the compressor, the compressed air charge flows through the charge-air cooler and the throttle valve to the intake manifold. The charge-air cooler may be an air-to-air or air-to-water heat exchanger, for example. In the embodiment shown in FIG. 1, the pressure of the air charge within the intake manifold is sensed by manifold air pressure (MAP) sensor 24. A compressor by-pass valve (not shown) may be coupled in series between the inlet and the outlet of compressor 74. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 25 is coupled to a series of combustion chambers (e.g., cylinders) 30 through a series of intake valves 62. The combustion chambers are further coupled to exhaust manifold 36 via a series of exhaust valves 64. More specifically, each cylinder 30 may be serviced by one or more valves. In the present example, each cylinder 30 includes a corresponding intake valve 62 and an exhaust valve 64. Engine system 100 further includes one or more camshafts 68 for operating intake valve 62 and/or exhaust valve 64. In the depicted example, intake camshaft 68 is coupled to intake valve 62 and can be actuated to operate intake valve 62. In some embodiments, where the intake valve of a plurality of cylinders 30 are coupled to a common camshaft, intake camshaft 68 can be actuated to operate the intake valves of all the coupled cylinders.

Intake valve 62 is actuatable between an open position that allows intake air into the corresponding cylinder and a closed position substantially blocking intake air from the cylinder. Intake camshaft 68 may be included in intake valve actuation system 69. Intake camshaft 68 includes intake cam 67 which has a cam lobe profile for opening intake valve 62 for a defined intake duration. In some embodiments (not shown), the camshaft may include additional intake cams with an alternate cam lobe profile that allows the intake valve 62 to be opened for an alternate duration (herein also referred to as a cam profile switching system). Based on the lobe profile of the additional cam, the alternate duration may be longer or shorter than the defined intake duration of intake cam 67. The lobe profile may affect cam lift height, cam duration, and/or cam timing. A controller may be able to switch the intake valve duration by moving intake camshaft 68 longitudinally and switching between cam profiles.

In the same manner, each exhaust valve 64 is actuatable between an open position allowing exhaust gas out of the corresponding cylinder and a closed position substantially retaining gas within the cylinder. It will be appreciated that while only intake valve 62 is shown to be cam-actuated, exhaust valve 64 may also be actuated by a similar exhaust camshaft (not shown). In some embodiments, where the exhaust valve of a plurality of cylinders 30 is coupled to a common camshaft, the exhaust camshaft can be actuated to operate the exhaust valves of all the coupled cylinders. As with intake camshaft 68, when included, the exhaust camshaft may include an exhaust cam having a cam lobe profile for opening exhaust valve 64 for a defined exhaust duration. In some embodiments, the exhaust camshaft may further include additional exhaust cams with an alternate cam lobe profile that allows exhaust valve 64 to be opened for an alternate duration. The lobe profile may affect cam lift height, cam duration, and/or cam timing. A controller may be able to switch the exhaust valve duration by moving the exhaust camshaft longitudinally and switching between cam profiles.

It will be appreciated that the intake and/or exhaust camshafts may be coupled to cylinder subsets, and multiple intake and/or exhaust camshafts may be present. For example, a first intake camshaft may be coupled to the intake valves of a first subset of cylinders while a second intake camshaft may be coupled to the intake valves of a second subset of cylinders. Likewise, a first exhaust camshaft may be coupled to the exhaust valves of a first subset of cylinders while a second exhaust camshaft may be coupled to the exhaust valves of a second subset of cylinders. Further still, one or more intake valves and exhaust valves may be coupled to each camshaft. The subset of cylinders coupled to the camshaft may be based on their position along an engine block, their firing order, the engine configuration, etc.

Intake valve actuation system 69 and exhaust valve actuation system (not shown) may further include push rods, rocker arms, tappets, etc. Such devices and features may control actuation of the intake valve 62 and the exhaust valve 64 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 30 may each have more than one exhaust valve and/or intake valve. In still other examples, each of the exhaust valve 64 and intake valve 62 of one or more cylinders may be actuated by a common camshaft. Further still, in some examples, some of the intake valves 62 and/or exhaust valves 64 may be actuated by their own independent camshaft or other device.

Engine system 100 may include variable valve timing systems, for example, variable cam timing VCT system 80. A variable valve timing system may be configured to open a first valve for a first duration during a first operating mode. The first operating mode may occur at an engine load below a part engine load threshold. Further, the variable valve timing system may be configured to open the first valve for a second duration, shorter than the first duration, during a second operating mode. The second operating mode may occur at an engine load above an engine load threshold and an engine speed below an engine speed threshold (e.g., during low to mid engine speeds).

In the depicted embodiment, exhaust manifold 36 includes a plurality of exhaust manifold sections to enable effluent from different combustion chambers to be directed to different locations in the engine system. In particular, effluent from the first cylinder group 17 (cylinders 1-3) is directed through turbine 76 of exhaust manifold 36 before being processed by an exhaust catalyst of emission control device 170. Exhaust from the second cylinder group 18 (cylinder 4), in comparison, is routed back to intake manifold 25 via passage 50, and exhaust catalyst 70. Alternatively, at least a portion of exhaust from the second cylinder group is directed to turbine 76 of exhaust manifold 36 via valve 65 and passage 56. By adjusting valve 65, a proportion of exhaust directed from cylinder 4 to the exhaust manifold relative to the intake manifold may be varied. In some examples, valve 65 and passage 56 may be omitted. In some other examples, the exhaust gasses from cylinder 4 may be directed to either the intake manifold or exhaust manifold by selecting which of 2 exhaust valves opens, with each exhaust valve routing gas to a different exhaust manifold.

Exhaust catalyst 70 is configured as a water gas shift (WGS) catalyst. WGS catalyst 70 is configured to generate hydrogen gas from rich exhaust gas received in passage 50 from cylinder 4. In alternate embodiments, exhaust catalyst 70 may be omitted from passage 50.

Each of cylinders 1-4 may include internal EGR by trapping exhaust gases from a combustion event in the respective cylinder and allowing the exhaust gases to remain in the respective cylinder during a subsequent combustion event. The amount of internal EGR may be varied via adjusting intake and/or exhaust valve opening and/or closing times. For example, by increasing intake and exhaust valve overlap, additional EGR may be retained in the cylinder during a subsequent combustion event. External EGR is provided to cylinders 1-4 solely via exhaust flow from the second cylinder group 18 (herein, cylinder 4) and EGR passage 50. In another example, external EGR may only be provided to cylinders 1-3 and not to cylinder 4. External EGR is not provided by exhaust flow from cylinders 1-3. Thus, in this example, cylinder 4 is the sole source of external EGR for engine 10 and therefore is also referred to herein as the dedicated EGR cylinder (or dedicated cylinder group). By recirculating exhaust from one cylinder of the four-cylinder engine to the engine intake manifold, a nearly constant (e.g., around 25%) EGR rate can be provided. Cylinders 1-3 are also referred to herein as a non-dedicated EGR cylinder group. While the current example shows the dedicated EGR cylinder group as having a single cylinder, it will be appreciated that in alternate engine configurations, the dedicated EGR cylinder group may have more engine cylinders (e.g., more than one engine cylinder).

EGR passage 50 may include an EGR cooler 54 for cooling EGR delivered to the engine intake. In addition, EGR passage 50 may include a first exhaust gas sensor 51 for estimating an air-fuel ratio of the exhaust recirculated from the second cylinder group to the remaining engine cylinders. A second exhaust gas sensor 52 may be positioned downstream of the exhaust manifold sections of the first cylinder group for estimating an air-fuel ratio of exhaust in the first cylinder group. Still further exhaust gas sensors may be included in the engine system of FIG. 1. A hydrogen concentration in external EGR from cylinder 4 may be increased via enriching an air-fuel mixture combusted in cylinder 4. In particular, the amount of hydrogen gas generated at WGS catalyst 70 may be increased by increasing the degree of richness of exhaust received in passage 50 from cylinder 4. Thus, to provide hydrogen enriched exhaust to engine cylinders 1-4, fueling of the second cylinder group 18 may be adjusted so that cylinder 4 is enriched (e.g., by decreasing the air-fuel ratio). In one example, the hydrogen concentration of the external EGR from cylinder 4 may be increased during conditions when engine combustion stability is less than desired. This action increases hydrogen concentration in external EGR and it may improve engine combustion stability, especially at lower engine speeds and loads (e.g., idle). In addition, the hydrogen enriched EGR allows much higher levels of EGR to be tolerated in the engine, as compared to conventional (lower hydrogen concentration) EGR, before encountering any combustion stability issues. By increasing the range and amount of EGR usage, engine fuel economy is improved.

Combustion chambers 30 may be supplied one or more fuels, such as gasoline, alcohol fuel blends, diesel, biodiesel, compressed natural gas, etc. Fuel may be supplied to the combustion chambers via injector 66. Fuel injector 66 may draw fuel from fuel tank 26. In the depicted example, fuel injector 66 is configured for direct injection though in other embodiments, fuel injector 66 may be configured for port injection or throttle valve-body injection. Further, each combustion chamber may include one or more fuel injectors of different configurations to enable each cylinder to receive fuel via direct injection, port injection, throttle valve-body injection, or combinations thereof. In the combustion chambers, combustion may be initiated via spark ignition and/or compression ignition.

Exhaust from exhaust manifold 36 is directed to turbine 76 to drive the turbine. When reduced turbine torque is desired, some exhaust may be directed instead through a wastegate (not shown), by-passing the turbine. The combined flow from the turbine and the wastegate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap NOx from the exhaust flow when the exhaust flow is lean, and to reduce the trapped NOx when the exhaust flow is rich. In other examples, an exhaust after-treatment catalyst may be configured to disproportionate NOx or to selectively reduce NOx with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regenerable soot filter configured to trap and oxidize soot particles in the exhaust flow. All or part of the treated exhaust from emission control device 170 may be released into the atmosphere via exhaust conduit 35.

Engine system 100 further includes a control system 14. Control system 14 includes a controller 12, which may be any electronic control system of the engine system or of the vehicle in which the engine system is installed. Controller 12 may be configured to make control decisions based at least partly on input from one or more sensors 16 within the engine system, and may control actuators 81 based on the control decisions. For example, controller 12 may store computer-readable instructions in memory, and actuators 81 may be controlled via execution of the instructions. Example sensors include MAP sensor 24, MAF sensor 55, exhaust gas temperature and pressure sensors 128 and 129, and exhaust gas oxygen sensors 51, 52, and a crankcase ventilation pressure sensor (not shown). Example actuators include throttle 20, fuel injector 66, dedicated cylinder group valve 65, etc. Additional sensors and actuators may be included, as described in FIG. 2.

Storage medium read-only memory in controller 12 can be programmed with computer readable data representing instructions executable by a processor for performing the methods described below, as well as other variants that are anticipated but not specifically listed. Example methods and routines are described herein with reference to FIGS. 3-4.

Figure 2:
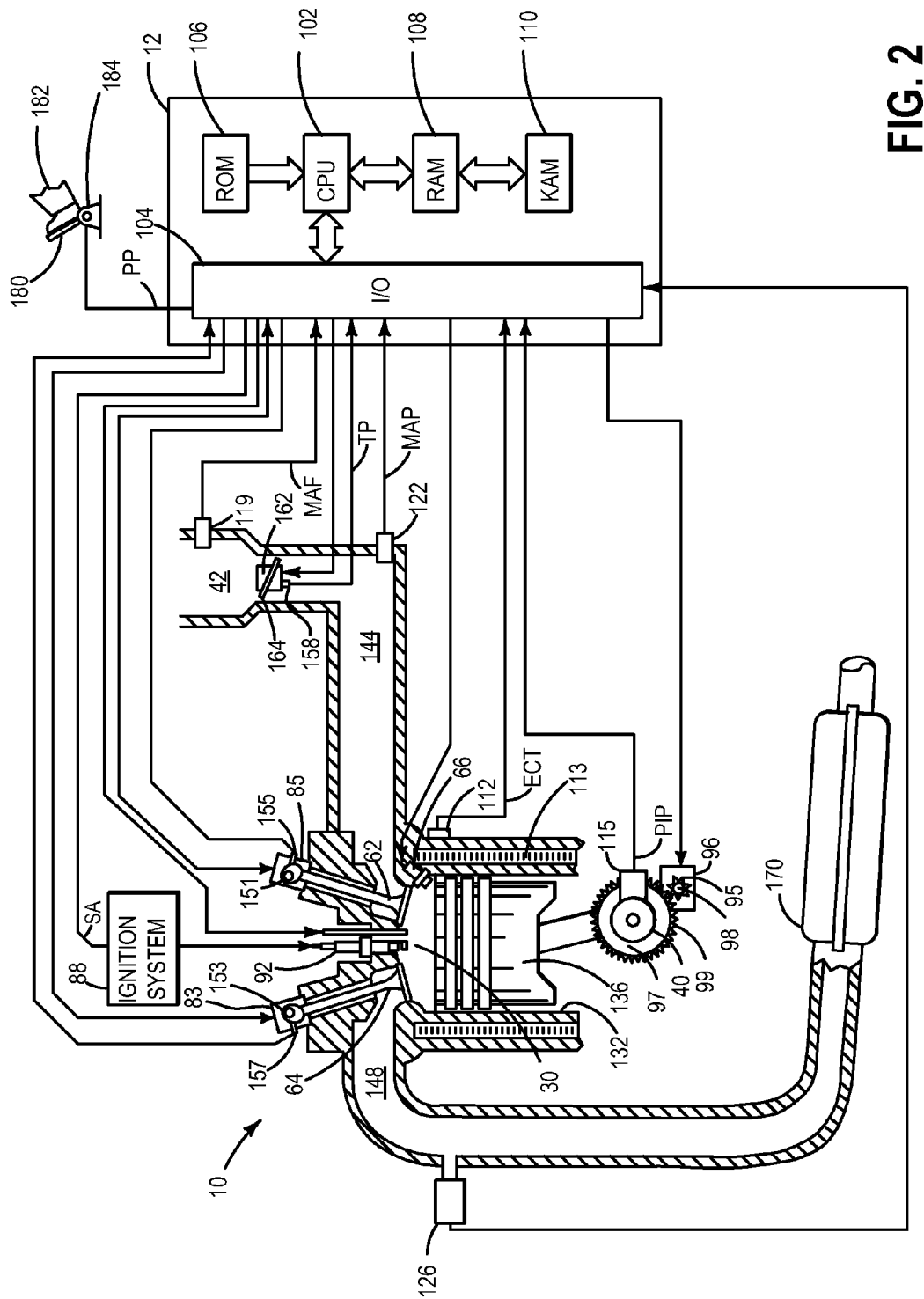
FIG. 2 is a schematic depiction of a combustion chamber of the engine.

Referring to FIG. 2, internal combustion engine 10 comprises a plurality of cylinders as shown in FIG. 1, one cylinder of which is described now. Engine 10 includes combustion chamber 30 and cylinder walls 132 with piston 136 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 144 and exhaust manifold 148 via respective intake valve 62 and exhaust valve 64. Each intake and exhaust valve may be operated independently by an intake cam 151 (such as intake cam 67 shown in FIG. 1) and an exhaust cam 153. Intake valve adjuster 85 advances or retards the phase of intake valve 62 relative to a position of crankshaft 40. Additionally, intake valve adjuster 85 may increase or decrease an intake valve lift amount. Exhaust valve adjuster 83 advances or retards the phase of exhaust valve 64 relative to a position of crankshaft 40. Further, exhaust valve adjuster 83 may increase or decrease an exhaust valve lift amount. The position of intake cam 151 may be determined by intake cam sensor 155. The position of exhaust cam 153 may be determined by exhaust cam sensor 157. In cases where combustion chamber 30 is part of a dedicated EGR cylinder, the timing and/or lift amount of valves 62 and 64 may be adjusted independently of other engine cylinders so that the cylinder air charge of the dedicated EGR cylinder may be increased or decreased relative to other engine cylinders. In this way, external EGR supplied to engine cylinders may be greater than or less than twenty five percent of the cylinder charge mass. External EGR is exhaust that is pumped out of exhaust valves of a cylinder and returned to cylinders via cylinder intake valves. Further, the internal EGR amount of cylinders other than the EGR cylinder may be adjusted independently of the dedicated EGR cylinder by adjusting valve timing of those respective cylinders. Internal EGR is exhaust that remains in a cylinder after a combustion event and is part of a mixture in the cylinder for a subsequent combustion event.

Fuel injector 66 is shown positioned to inject fuel directly into cylinder 30, which is known to those skilled in the art as direct injection. Alternatively, fuel may be injected to an intake port, which is known to those skilled in the art as port injection. In some example engine configurations, one or more engine cylinders may receive fuel from both direct and port fuel injectors.

In one example, fuel injector 66 may be a selectively deactivatable fuel injector. Thus, an engine cylinder may be selectively deactivated by turning off fuel to the given cylinder. In the context of the dedicated EGR cylinder (cylinder 4 of FIG. 1), injector 66 fueling the EGR cylinder may be deactivated during selected conditions when EGR demand is low so as to allow for a rapid drop in external EGR from the dedicated cylinder. These may include, for example, conditions when engine load is low (e.g., lower than a threshold load), during an engine cold-start, or during a catalyst warm-up condition. However, torque transients may occur as the EGR falls. Specifically, deactivation of the dedicated EGR cylinder leads to an immediate drop in engine torque. Then, after the EGR has sufficiently purged from the intake manifold, a higher amount of fresh air is received in the remaining engine cylinders, leading to a torque surge.

In some embodiments, the dedicated EGR cylinder may be selectively deactivated by shutting off air in addition to shutting off fuel. For example, either the intake valves or the exhaust valves of the dedicated EGR cylinder may be deactivated. By deactivating either the intake valves or the exhaust valves, the pumping work of the cylinder may be increased, which may be desired during catalyst warm-up. Maximizing pumping work of the dedicated EGR cylinder may also include adjusting cam phasing, valve lift, the position of a port throttle, or a charge motion control device, etc. Alternatively, all valves of the dedicated EGR cylinder may be deactivated when it is desired to reduce EGR without increasing pumping work, for example at low engine loads after the catalyst is warmed up.

Intake manifold 144 is shown communicating with optional electronic throttle 162 which adjusts a position of throttle plate 164 to control air flow from air intake 42 to intake manifold 144. In some examples, throttle 162 and throttle plate 164 may be positioned between intake valve 62 and intake manifold 144 such that throttle 162 is a port throttle. Driver demand torque may be determined from a position of accelerator pedal 180 as sensed by accelerator pedal sensor 184. A voltage or current indicative of driver demand torque is output from accelerator pedal sensor 184 when driver's foot 182 operates accelerator pedal 180.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 148 upstream of emission control device 170 which may include a catalytic converter. Alternatively, a two-state exhaust gas oxygen sensor may be substituted for UEGO sensor 126.

Emission control device 170 can include multiple catalyst bricks, in one example. In another example, multiple emission control devices, each with multiple bricks, can be used. Emission control device 170 can be a three-way type catalyst in one example.

Controller 12 is shown in FIG. 2 as a conventional microcomputer including: microprocessor unit 102, input/output ports 104, read-only (non-transitory) memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 113; a measurement of engine manifold pressure (MAP) from pressure sensor 122 coupled to intake manifold 144; an engine position sensor from a Hall effect sensor 115 sensing crankshaft 40 position; a measurement of air mass entering the engine from sensor 119; and a measurement of throttle position from sensor 158. Barometric pressure may also be sensed (sensor not shown) for processing by controller 12. In a preferred aspect of the present description, engine position sensor 115 produces a predetermined number of equally spaced pulses every revolution of the crankshaft from which engine speed (RPM) can be determined. During operation, each cylinder within engine 10 typically undergoes a four stroke cycle: the cycle includes the intake stroke, compression stroke, expansion stroke, and exhaust stroke. During the intake stroke, generally, the exhaust valve 64 closes and intake valve 62 opens. Air is introduced into combustion chamber 30 via intake manifold 144, and piston 136 moves to the bottom of the cylinder so as to increase the volume within combustion chamber 30. The position at which piston 136 is near the bottom of the cylinder and at the end of its stroke (e.g. when combustion chamber 30 is at its largest volume) is typically referred to by those of skill in the art as bottom dead center (BDC). During the compression stroke, intake valve 62 and exhaust valve 64 are typically closed. Piston 136 moves toward the cylinder head so as to compress the air within combustion chamber 30. The point at which piston 136 is at the end of its stroke and closest to the cylinder head (e.g. when combustion chamber 30 is at its smallest volume) is typically referred to by those of skill in the art as top dead center (TDC).

In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 136 back to BDC. Crankshaft 40 converts piston movement into a rotational torque of the rotary shaft. Finally, during the exhaust stroke, the exhaust valve 64 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

As introduced above, engine systems having dedicated EGR systems may include a first cylinder group with one or more dedicated EGR cylinders that route exhaust to the intake manifold (e.g., to the intake of all the cylinders of the engine). A second cylinder group may include one or more non-dedicated EGR cylinders that do not route exhaust to the intake manifold and instead route exhaust to an exhaust passage and eventually to atmosphere. As such, external EGR may only be provided by the first cylinder group including the dedicated EGR cylinders. The one or more dedicated EGR cylinders may provide a relatively constant rate of EGR to the engine. This may be advantageous for reducing knock and increasing combustion stability at higher EGR rates.

However, in some engine systems including one or more dedicated EGR cylinders, exhaust blowdown pulses to the turbine may not be evenly spaced. Further, in engine systems with only a single dedicated EGR cylinder a single pulse of EGR is introduced into the intake manifold, thereby resulting in uneven mixing. For example, in a four cylinder engine with one dedicated EGR cylinder and three non-dedicated EGR cylinders, a nearly constant EGR rate of 25% may be supplied to the intake manifold at one time. In this configuration, two of the non-dedicated EGR cylinders may be affected by 180° pulse interference while one of the non-dedicated EGR cylinders is not affected by the pulse interference. The issues described above may result in compressor surge and air-fuel and spark control issues.

FIG. 3 shows a cylinder firing interval graph for a four cylinder engine including one dedicated EGR cylinder. Specifically, graph 300 shows cylinder number on the y-axis and crank angle degree on the x-axis. Cylinders 2-4 are non-dedicated cylinders routing exhaust to a turbine while cylinder 1 is a dedicated EGR cylinder routing exhaust to the intake manifold and not the turbine. As described above, cylinder 1 may be an only cylinder of the engine recirculating exhaust to the intake manifold. The solid lines indicate when exhaust valves for a given cylinder are open and the dashed lines indicated when intake valves for a given cylinder are open. In the example shown in graph 300, the cylinder firing order is 1-3-4-2. However, other firing orders are possible. For example, a cylinder firing order of 1-2-4-3 is also possible.

As shown in FIG. 3, the engine has a firing interval of 180 crank angle degrees. As discussed above, this produces uneven spacing of exhaust blowdown pulses to the turbine. For example, as shown at 302, the exhaust valve of cylinder 4 opens just before 180 crank angle degrees. Then, before 360 crank angle degrees, as shown at 304, the exhaust valve of cylinder 2 opens. Just before 540 crank angle degrees the exhaust valve of dedicated EGR cylinder 1 opens. The exhaust valve of the third non-dedicated cylinder, cylinder 3, doesn't open until just before 720 crank angle degrees, as shown at 306, due to the dedicated EGR cylinder 1 firing between cylinder 2 and cylinder 3. As a result, there is an interval 308 between when the exhaust valve of cylinder 2 closes and the exhaust valve of cylinder 3 opens where no exhaust flows to the turbine.

Further, as shown at 302, the exhaust valve of cylinder 4 opens before the exhaust valve of cylinder 3 closes. As a result, 180° blowdown pulse interference occurs during the cylinder 3 and cylinder 4 exhaust valve overlap 310. For example, the exhaust blowdown pulse from cylinder 4 propagates through the exhaust manifold and can affect the in-cylinder pressure of cylinder 3. Similarly, the open exhaust valve of cylinder 3 can also affect the in-cylinder pressure of cylinder 4. This blowdown interference can affect the exhaust stroke pumping work and the exhaust pressure during overlap, which in turn affects the residual fraction in the overlapping cylinders.

Likewise, pulse interference occurs when the exhaust valve of cylinder 2 opens while the exhaust valve of cylinder 4 is still open, as shown at 312. As shown in FIG. 3, the valve overlap and resulting blowdown pulse interference occurs for 180° of crank rotation. However, in alternate examples, the valve overlap may be more or less than 180° of crank rotation. As shown in FIG. 3, no pulse interference occurs at the end of the exhaust valve opening of cylinder 2 since the exhaust from cylinder 1 flows to the intake manifold and not the turbine.

The exhaust valve opening events and exhaust valve opening overlap of the engine cylinders may be adjusted to create more even spacing between blowdown pulses at the turbine. For example, FIG. 4 shows a cylinder firing order graph for a four cylinder engine including one dedicated EGR cylinder (as shown in FIG. 3). However, graph 400 shows a firing interval where firing of the non-dedicated EGR cylinders (cylinders 2-4) are spaced 240 crank angle degrees apart from one another. The dedicated EGR cylinder (cylinder 1) is then spaced 120 crank angle degrees between two of the non-dedicated EGR cylinders (e.g., cylinder 4 and cylinder 3).

Specifically, graph 400 shows cylinder number on the y-axis and crank angle degree on the x-axis. Cylinders 2-4 are non-dedicated cylinders routing exhaust to a turbine while cylinder 1 is a dedicated EGR cylinder routing exhaust to the intake manifold and not the turbine. In this example, cylinder 1 is the only cylinder recirculating exhaust to the intake manifold. The solid lines indicate when exhaust valves for a given cylinder are open and the dashed lines indicated when intake valves for a given cylinder are open. In the example shown in graph 400, the cylinder firing order is 1-3-2-4. However, other firing orders (such as 1-4-2-3, 1-2-3-4, 1-3-4-2, 1-2-4-3 and 1-4-3-2) with similar exhaust valve opening overlap as described further below are possible. For example, in all cases, cylinder 1 fires 120 degrees after the previous cylinder and 120 degrees before the subsequent cylinder.

As shown in FIG. 4, the exhaust valve of cylinder 3 opens at 402. The exhaust valve of cylinder 3 is open for approximately 240 crank angle degrees of rotation and then closes at 404. Either simultaneously or just after closing of the exhaust valve of cylinder 3, the exhaust valve of cylinder 2 opens. The exhaust valve of cylinder 2 closes approximately 240 crank angle degrees after opening at 406. The exhaust valve of cylinder 4 then opens simultaneously or following the closing of the exhaust valve of cylinder 2. After approximately 240° of crank rotation, the exhaust valve of cylinder 4 closes. In this way, the exhaust valve opening events of cylinders 2-4 (the non-dedicated EGR cylinders routing exhaust to the turbine) are non-overlapping. Said another way, no two exhaust valves of two different non-dedicated EGR cylinders are open concurrently. As a result, little to no exhaust blowdown pulse interference occurs, thereby reducing exhaust stroke pumping work of the cylinders. Further, the residual mass trapped in the non-dedicated cylinders (e.g., cylinders 2-4) may be uniform. Additionally, the exhaust pulses from cylinders 2-4 are spaced evenly throughout a complete engine cylinder (e.g., 720° of crank rotation). As a result, the exhaust pulses to the turbine are delivered continuously and evenly throughout the engine cycle. This may also allow a longer exhaust cam profile without the use of a twin scroll turbine housing which may improve fuel economy and reduce compressor surge.

Returning to FIG. 4, the exhaust valve of cylinder 1 (the dedicated EGR cylinder) opens during the exhaust valve opening of cylinder 4 and subsequently closes during the exhaust valve opening of cylinder 3. More specifically, the exhaust valve of cylinder 1 opens approximately 120° of crank rotation after opening of the exhaust valve of cylinder 4. Then, the exhaust valve of cylinder 1 closes 120° of crank rotation after opening of the exhaust valve of cylinder 3. Said another way, the exhaust valve of non-dedicated EGR cylinder 4 closes while the exhaust valve of dedicated EGR cylinder 1 is open and the exhaust valve of non-dedicated EGR cylinder 3 opens while the exhaust valve of EGR cylinder 1 is open. In this way, the exhaust valve opening of dedicated EGR cylinder 1 overlaps with the exhaust valve opening of both non-dedicated EGR cylinders 4 and 3. Even through exhaust valve overlap occurs between cylinder 4 and cylinder 1 and cylinder 3 and cylinder 1, no blowdown pulse interference occurs since the exhaust from cylinder 1 is routed to the intake manifold and not to the turbine.

In this way, an engine method may comprise operating a first set of exhaust valves of a first group of cylinders routing exhaust to a turbine to have no exhaust valve opening overlap (e.g., with respect to exhaust valves of other cylinders of the first group of cylinders) and operating an exhaust valve of a dedicated EGR cylinder routing exhaust to an intake manifold so that opening of the second exhaust valve overlaps with opening of exhaust valves of two cylinders of the first group of cylinders. As one example, operating the exhaust valve of the dedicated EGR cylinder includes opening the exhaust valve of the dedicated EGR cylinder before closing a first exhaust valve of the first set of exhaust valves and closing the exhaust valve of the dedicated EGR cylinder after opening a second exhaust valve of the second set of exhaust valves. Further, operating the first set of exhaust valves includes opening each exhaust valve of the first set of exhaust valves for a duration resulting in even exhaust pulses to a turbine over a complete engine cycle. The method may further comprise firing each cylinder of the first group of cylinders 240 crank angle degrees apart and firing the dedicated EGR cylinder 120 crank angle degrees before a first cylinder of the first group of cylinders and 120 crank angle degrees after a second cylinder of the first group of cylinders.

In one example, the first group of cylinders includes only three non-dedicated EGR cylinders routing exhaust to the turbine and not to the intake manifold. The method further comprises, firing a first cylinder of the first group of cylinders 120 crank angle degrees after firing the dedicated EGR cylinder, firing a second cylinder of the first group of cylinders 240 crank angle degrees after firing the first cylinder of the first group of cylinders, firing a third cylinder of the first group of cylinders 240 crank angle degrees after firing the second cylinder, and firing the dedicated EGR cylinder 120 crank angle degrees after firing the third cylinder. Additionally, pistons of the first group of cylinders and a piston of the dedicated EGR cylinder are coupled to corresponding crank pins on an in-line crankshaft. In one example, the dedicated EGR cylinder is an only cylinder routing exhaust to the intake manifold. Further, each cylinder of the first group of cylinders is a non-dedicated EGR cylinder routing exhaust via one of the first set of exhaust valves to the turbine, the turbine positioned downstream of an exhaust manifold.

A design of the engine crankshaft and camshaft(s) may be adapted to deliver the firing interval and exhaust valve timing described above with regard to FIG. 4. For example, the crankshaft or camshaft design, as well as the camshaft timing, may be adapted to reduce exhaust valve overlap between non-dedicated EGR cylinders and more evenly space exhaust pulses to the turbine over the engine cycle.

Figure 5:
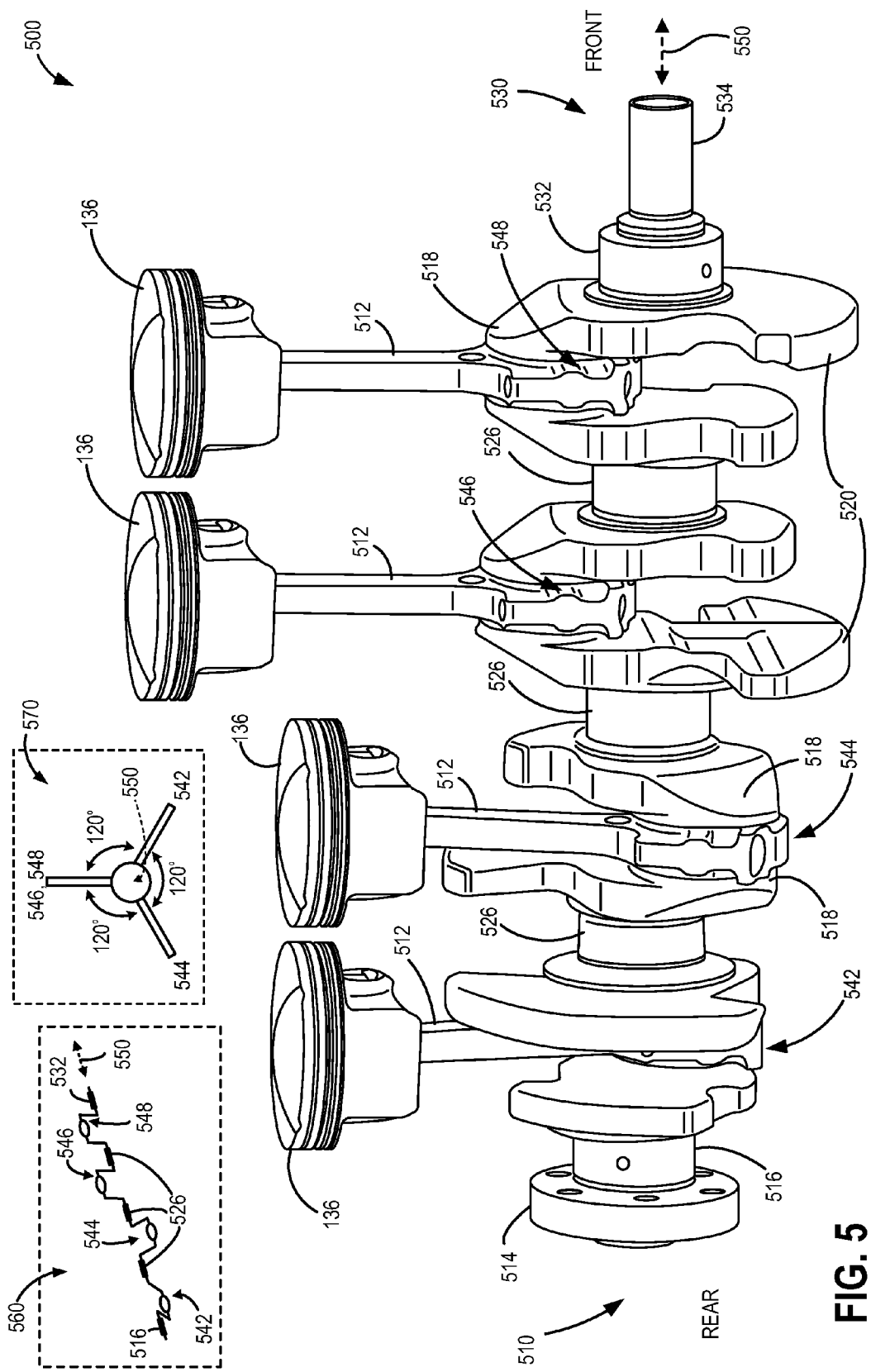
FIG. 5 is an illustration of a crankshaft in accordance with the present disclosure.

Accordingly, an example crankshaft 500 that may be utilized for operating engine 10 with no exhaust valve overlap between non-dedicated EGR cylinders is shown in FIG. 5. More specifically, crankshaft 500 may deliver produce the cylinder firing and exhaust valve timing described in FIG. 4. FIG. 5 illustrates a perspective view of crankshaft 500. Crankshaft 500 may be crankshaft 40 shown in FIG. 2. The crankshaft depicted in FIG. 5 may be utilized in an engine, such as engine 10 of FIGS. 1-2, having an inline configuration in which the cylinders are aligned in a single row. A plurality of pistons 136 may be coupled to crankshaft 500, as shown. Further, since engine 10 is an inline four-cylinder engine, FIG. 5 depicts four pistons arranged in a single row along a length of the crankshaft 500.

Crankshaft 500 has a crank nose end 530 with crank nose 534 for mounting pulleys and/or for installing a harmonic balancer (not shown) to reduce torsional vibration. Crankshaft 500 further includes a flange end 510 with a flange 514 configured to attach to a flywheel (not shown). In this way, energy generated via combustion may be transferred from the pistons to the crankshaft and flywheel, and thereon to a transmission thereby providing motive power to a vehicle.

Crankshaft 500 may also comprise a plurality of pins, journals, cheeks (e.g., webs), and counterweights 520. In the depicted example, crankshaft 500 includes a front main bearing journal 532 and a rear main bearing journal 516. Apart from these main bearing journals at the two ends, crankshaft 500 further includes three main bearing journals 526 positioned between front main bearing journal 532 and rear main bearing journal 516. Thus, crankshaft 500 has five main bearing journals wherein each journal is aligned with a central axis of rotation 550. The main bearing journals 516, 532, and 526 support bearings that are configured to enable rotation of crankshaft 500 while providing support to the crankshaft 500. In alternate embodiments, the crankshaft may have more or less than five main bearing journals.

Crankshaft 500 also includes a first crank pin 548, a second crank pin 546, a third crank pin 544, and a fourth crank pin 542 (arranged from crank nose end 530 to flange end 510). Thus, crankshaft 500 has a total of four crank pins. However, crankshafts having an alternate number of crank pins have been contemplated. Crank pins 542, 544, 546, and 548 may each be mechanically coupled to respective piston connecting rods 512, and thereby, respective pistons 136. It will be appreciated that during engine operation, crankshaft 500 rotates around the central axis of rotation 550. Crank webs 518 may support crank pins 542, 544, 546, and 548. Crank webs 518 may further couple the crank pins to the main bearing journals 516, 532, and 526.

The second crank pin 546 and the first crank pin 548 are arranged at similar radial positions with regard to rotational axis 550. Therefore, first crank pin 548 is aligned with second crank pin 546. Further, the second crank pin 546, the third crank pin 544 and the fourth crank pin 542 are arranged 120 degrees apart from each other around the central axis of rotation 550. In other words, as depicted in FIG. 5 for crankshaft 500, fourth crank pin 542 is shown swaying away from the viewer (into the page), third crank pin 544 is moving toward the viewer (out of the page) while second crank pin 546 and first crank pin 548 are in the plane of the paper.

Inset 560 shows a schematic drawing of crankshaft 500 depicting the positions of the four crank pins relative to central axis of rotation 550. Inset 570 shows a schematic diagram of a side view of crankshaft 500 indicating the positions of the crank pins in relation to the center axis of crankshaft 500 and central axis of rotation 550. As shown in inset 560, the fourth crank pin 542, and the third crank pin 544 are positioned in opposite directions relative to and around the central axis of rotation 550. Said another way, the fourth crank pin 542 and the third crank pin 544 are angled relative to one another around the central axis of rotation 550. Similarly, the third crank pin 544 and the second crank pin 546 are angled relative to one another around the central axis of rotation 550. As further shown in inset 570, the second crank pin 546, the third crank pin 544 and the fourth crank pin 542 are positioned 120 degrees apart from each other around the center axis (e.g., rotational axis) of crankshaft 500. Further, first crank pin 548 and second crank pin 546 are aligned and parallel with each other around the central axis of rotation 550. As shown in inset 570, first crank pin 548 and second crank pin 546 are positioned vertically above the central axis of rotation 550 (e.g., at zero degrees) while third crank pin 544 is positioned 120 degrees counterclockwise from first crank pin 548 and second crank pin 546. Fourth crank pin 542 is positioned 120 degrees clockwise from first crank pin 548 and second crank pin 546.

It will be appreciated that even though first crank pin 548 is aligned with second crank pin 546, and each of the two pistons coupled to first crank pin 548 and second crank pin 546 is depicted in FIG. 5 at a top-dead-center (TDC) position, the two pistons may be at the end of different strokes. For example, the piston coupled to first crank pin 548 may be at the end of a compression stroke while the piston associated with second crank pin 546 may be at the end of the exhaust stroke. Thus, the piston coupled to first crank pin 548 may be 360 crank angle degrees apart from the piston coupled to second crank pin 546.

The crank pin arrangement of FIG. 5 supports an engine firing order of 1-3-2-4 when all cylinders are firing. Herein, the firing order 1-3-2-4 comprises firing a first cylinder with a piston coupled to the first crank arm 548, firing the third cylinder with its piston coupled to the third crank pin 544 next, firing the second cylinder with piston coupled to the second crank pin 546 next, and then firing the fourth cylinder with piston coupled to the fourth crank pin 542. In the example of engine 10 with crankshaft 500, firing events in the four cylinders with firing order 1-3-2-4 may occur at the following uneven intervals: 120°-240°-240°-120°. Since first crank pin 548 is aligned with second crank pin 546, and their piston strokes occur 360 crank angle degrees apart, firing events in the first cylinder and the second cylinder also occur at 360° intervals. Engine firing events will be further described in reference to FIG. 6.

Thus, the components of FIGS. 1-2 and 5 provide for a system for an engine comprising: a crankshaft with four crank pins, three non-dedicated EGR cylinders routing exhaust to a turbine via a first set of exhaust valves, a single dedicated EGR cylinder routing exhaust to an intake manifold via a second exhaust valve, and a controller configured with computer readable instructions for operating opening of the first set of exhaust valves to be non-overlapping and operating opening of the second exhaust valve to overlap with opening of two of the first set of exhaust valves. The three non-dedicated EGR cylinders have a crankshaft angle firing interval of 240 degrees relative to one another and the single dedicated EGR cylinder has a crankshaft angle firing interval of 120 degrees between two of the three non-dedicated EGR cylinders. In another example, the three non-dedicated EGR cylinders have a crankshaft angle firing interval of approximately 240 degrees relative to one another and the single dedicated EGR cylinder has a crankshaft angle firing interval of approximately 120 degrees between two of the three non-dedicated EGR cylinders (e.g., within a range of 120 degrees). Further, the crankshaft includes a second crank pin, a third crank pin, and a fourth crank pin positioned 120 degrees apart around a centerline of the crankshaft. Additionally, the crankshaft includes a first crank pin aligned with the second crank pin.

Turning now to FIG. 6, it portrays an example cylinder firing diagram for the cylinder firing order described above with regard to FIG. 4. In one example, crankshaft 500 shown in FIG. 5 may produce the cylinder firing order shown in FIG. 6. For example, engine 10 may be fired unevenly based on the design of crankshaft 500. As shown in the depicted example, cylinder 1 may be fired between cylinders 3 and 4. In one example, cylinder 1 may be fired approximately 120 crankshaft angle (CA) degrees after cylinder 4 is fired. In one example, cylinder 1 may be fired exactly 120 CA degrees after cylinder 4 is fired. In another example, cylinder 1 may be fired 115 CA degrees after cylinder 4 fires. In yet another example, cylinder 1 may be fired 125 CA degrees after firing cylinder 4. Further, cylinder 1 may be fired approximately 120 CA degrees before cylinder 3 is fired. For example, cylinder 1 may be fired in a range of between 115 and 120 CA degrees before cylinder 3 is fired. In addition, cylinders 2, 3, and 4 may continue to have combustion events 240 CA degrees apart with a combustion event in cylinder 1 occurring approximately midway between the combustion events in cylinder 4 and cylinder 3. Therefore, engine 10 may be fired with the following firing order: 3-2-4-1 (or 1-3-2-4 since the firing is cyclic). As illustrated at 604, cylinder 3 may be fired approximately 120 degrees of crank rotation after cylinder 1 is fired, cylinder 2 may be fired approximately 240 degrees of crank rotation after firing cylinder 3, cylinder 4 may be fired at approximately 240 degrees of crank rotation after firing cylinder 2, and cylinder 1 may be fired again at approximately 120 degrees of crank rotation after firing cylinder 4.

FIG. 7 shows a method 700 for firing engine cylinders with a specified timing. Specifically, method 700 may include operating one or more cylinders of an in-line engine, such as the in-line engine shown in FIGS. 1-2. Further, method 700 may include adjusting cylinder spark timing and exhaust valve opening to have the firing and exhaust valve timing shown in FIG. 6 and FIG. 4. For example, method 700 may include adjusting a camshaft timing to have the desired firing and exhaust valve timing. In another example, a design of the camshaft may be adapted for producing the firing intervals described in the method below. In yet another example, a crankshaft, such as the crankshaft shown in FIG. 5, may be adapted for producing the firing intervals described in method 700 below.

Method 700 begins at 701 by firing a dedicated EGR cylinder (e.g., cylinder 1) and then opening an exhaust valve of the dedicated EGR cylinder. At 702 the method includes firing a first non-dedicated EGR cylinder and then opening an exhaust valve of the first non-dedicated EGR cylinder 120 crank angle degrees after the dedicated EGR cylinder. In one example, the first non-dedicated EGR cylinder may be cylinder 3 of FIG. 4 and FIG. 6. At 704, the method includes firing a second non-dedicated EGR cylinder (e.g., cylinder 2) and then opening an exhaust valve of the second non-dedicated EGR cylinder 240 crank angle degrees after the first non-dedicated EGR cylinder. More specifically, the exhaust valve of the second non-dedicated EGR cylinder may open 240° of crank angle rotation after opening the exhaust valve of the first non-dedicated EGR cylinder. The exhaust valve of the first non-dedicated EGR cylinder may close either before or while the exhaust valve of the second non-dedicated EGR cylinder closes. However, there may be no exhaust valve overlap between the exhaust valve of the first non-dedicated EGR cylinder and the second non-dedicated EGR cylinder. At 706, the method includes firing a third non-dedicated EGR cylinder (e.g., cylinder 4) and then opening an exhaust valve of the third non-dedicated EGR cylinder 240 crank angle degrees after the second non-dedicated EGR cylinder. At 708, the method includes again firing the dedicated EGR cylinder (e.g., cylinder 1) and then opening the exhaust valve of the dedicated EGR cylinder 120 crank angle degrees after the third non-dedicated EGR cylinder. The method then returns to 702. In alternate examples, since engine cylinder firing is repeated and cyclical, method 700 may begin at any of steps 702-710.

Thus, an engine method comprises operating three exhaust valves of three corresponding non-dedicated EGR cylinders to have no exhaust valve overlap with one another and opening a fourth exhaust valve of a dedicated EGR cylinder, the dedicated EGR cylinder being an only cylinder routing exhaust to an intake manifold, during opening of a first of the three exhaust valves and subsequently closing the fourth exhaust valve during opening of a second of the three exhaust valves. Opening the fourth exhaust valve of the dedicated EGR cylinder includes opening the fourth exhaust valve 120 crank angle degrees (e.g., approximately 120 crank angle degrees) after opening the first of the three exhaust valves and closing the fourth exhaust valve 120 crank angle degrees (e.g., approximately 120 crank angle degrees) after opening the second of the three exhaust valves. The method further comprises opening the second of the three exhaust valves 240 crank angle degrees (e.g., approximately 240 crank angle degrees) after opening the first of the three exhaust valves. In one example, operating the three exhaust valves of three corresponding non-dedicated EGR cylinders to have no exhaust valve overlap includes opening each of the three exhaust valves for a same duration over a complete engine cycle, the complete engine cycle including exhaust valve opening of all the non-dedicated EGR cylinders and the dedicated EGR cylinder. Opening each of the three exhaust valves for the same duration includes sending exhaust pulses of a same length to the turbine for each exhaust valve opening event, each exhaust pulse occurring consecutively over the complete engine cycle. In one example, operating the three exhaust valves of three corresponding non-dedicated EGR cylinders to have no exhaust valve overlap includes fully closing one valve of the three exhaust valves before opening another valve of the three exhaust valves. In another example, operating the three exhaust valves of three corresponding non-dedicated EGR cylinders to have no exhaust valve overlap includes simultaneously closing one valve of the three exhaust valves while opening another valve of the three exhaust valves.

It may be noted that an exhaust valve that is on the opening ramp or closing ramp of the lift profile may be slightly open, but may be considered substantially closed for the purpose of the definition of closed in this disclosure. For example, the duration from the beginning of the exhaust valve opening ramp to the end of the exhaust valve closing ramp may exceed 240 degrees, although the valve may not be substantially open for more than 240 degrees.

Additionally, it should be noted that each engine cylinder may include one or more exhaust valves. In one example, each cylinder may have only one exhaust valve. As such, the exhaust valves of the non-dedicated EGR cylinders may be operated to have no exhaust valve overlap with one another. Said another way, no exhaust valve of the exhaust valves of the non-dedicated EGR cylinders is open at the same time as any other exhaust valve of the exhaust valves of the non-dedicated cylinders. Additionally, the single exhaust valve of a dedicated EGR cylinder may be operated so that opening of the single dedicated EGR cylinder exhaust valve overlaps with opening of exhaust valves of two cylinders of the non-dedicated EGR cylinders.

In another example, each engine cylinder may include more than one exhaust valve. For example, each of cylinders 1-4 may include two exhaust valves, resulting in a total of 8 exhaust valves. In this case, no exhaust valve opening event of either valve of one non-dedicated EGR cylinder may overlap with exhaust valve opening of either valve of another non-dedicated EGR cylinder. Said another way, all the exhaust valves of the non-dedicated EGR cylinders may be operated to have no exhaust valve opening overlap with respect to exhaust valves of other non-dedicated EGR cylinders. For example, opening of exhaust valves of the same non-dedicated EGR engine cylinder may overlap with one another; however, the opening of either exhaust valve of one non-dedicated EGR cylinder may not overlap with exhaust valve opening of any other exhaust valves of other non-dedicated EGR cylinders. In this way, only exhaust valves of a same non-dedicated EGR cylinder may be open at the same time with respect to other exhaust valves of other non-dedicated EGR cylinders.

In this way, exhaust valves of an engine including at least one dedicated EGR cylinder routing exhaust to an intake manifold may be operated to decrease exhaust valve overlap between non-dedicated EGR cylinders routing exhaust to a turbine. Further, exhaust valve opening of the at least one dedicated EGR cylinder may be adjusted to overlap with exhaust valve events of a portion of the non-dedicated EGR cylinders. As a result, a technical effect of operating exhaust valves to more evenly space exhaust pulses to a turbine and reduce exhaust blowdown interference at the turbine is achieved. This may result in reduced compressor surge events and increased engine efficiency.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
   operating a first set of exhaust valves of a first group of cylinders routing exhaust to a turbine to have no overlap in exhaust valve opening events so that no exhaust valves of the first set of exhaust valves of different cylinders for the first group of cylinders are open at the same time;
   operating one or more exhaust valves in a second set of exhaust valves of a dedicated EGR cylinder routing exhaust to an intake manifold so that opening of the one or more exhaust valves in the second set of exhaust valves overlaps with opening of exhaust valves of two cylinders of the first group of cylinders; and
   firing the dedicated EGR cylinder, via ignition, at a different timing than each cylinder of the first group of cylinders.

2. The method of claim 1, wherein operating the one or more exhaust valves in the second set of exhaust valves of the dedicated EGR cylinder includes opening the one or more exhaust valves in the second set of exhaust valves of the dedicated EGR cylinder before closing a first exhaust valve of the first set of exhaust valves and closing the one or more exhaust valves in the second set of exhaust valves of the dedicated EGR cylinder after opening a second exhaust valve of the first set of exhaust valves.

3. The method of claim 1, wherein operating the first set of exhaust valves includes opening each exhaust valve of the first set of exhaust valves for a duration resulting in sending exhaust pulses of a same length to the turbine for each exhaust valve opening event of each exhaust valve of the first set of exhaust valves over a complete engine cycle and wherein firing the dedicated EGR cylinder includes igniting fuel injected into the dedicated EGR cylinder.

4. The method of claim 1, wherein firing the dedicated EGR cylinder, via ignition, at the different timing than each cylinder of the first group of cylinders includes firing, via ignition, each cylinder of the first group of cylinders 240 crank angle degrees apart and firing the dedicated EGR cylinder 120 crank angle degrees before a first cylinder of the first group of cylinders, 120 crank angle degrees after a second cylinder of the first group of cylinders, and 360 crank angle degrees after a third cylinder of the first group of cylinders.

5. The method of claim 1, wherein the first group of cylinders includes only three non-dedicated EGR cylinders routing exhaust to the turbine and not to the intake manifold and the dedicated EGR cylinder is the only cylinder routing exhaust to the intake manifold.

6. The method of claim 5, further comprising, via ignition, firing a first cylinder of the first group of cylinders 120 crank angle degrees after firing the dedicated EGR cylinder, firing a second cylinder of the first group of cylinders 240 crank angle degrees after firing the first cylinder of the first group of cylinders, firing a third cylinder of the first group of cylinders 240 crank angle degrees after firing the second cylinder, and firing the dedicated EGR cylinder 120 crank angle degrees after firing the third cylinder.

7. The method of claim 5, wherein pistons of the first group of cylinders and a piston of the dedicated EGR cylinder are coupled to corresponding crank pins on an in-line crankshaft.

8. The method of claim 1, further comprising overlapping an opening event of the exhaust valve of the dedicated EGR cylinder with opening events of two exhaust valves of two cylinders of the first group of cylinders, such that exhaust continues to flow to the turbine even while the exhaust valve of the dedicated EGR cylinder is open, each one of the two exhaust valves of the two cylinders of the first group cylinders belonging to a different one of the two cylinders of the first group of cylinders.

9. The method of claim 1, wherein each cylinder of the first group of cylinders is a non-dedicated EGR cylinder routing exhaust via one exhaust valve of the first set of exhaust valves to the turbine, the turbine positioned downstream of an exhaust manifold.

10. An engine method, comprising:
operating three exhaust valves of three corresponding non-dedicated EGR cylinders to have no exhaust valve opening overlap with one another so that none of the three exhaust valves, each of the three exhaust valves belonging to a different cylinder of the three non-dedicated EGR cylinders, are open at the same time;
opening an exhaust valve of a fourth cylinder, the fourth cylinder being a dedicated EGR cylinder, the dedicated EGR cylinder being the only cylinder routing exhaust to an intake manifold, during opening of a first of the three exhaust valves and subsequently closing the exhaust valve of the dedicated EGR cylinder during opening of a second of the three exhaust valves; and
firing, via ignition, the dedicated EGR cylinder midway between firing a first cylinder and a second cylinder of the non-dedicated EGR cylinders and 360 crank angle degrees after firing a third cylinder of the non-dedicated EGR cylinders.

11. The method of claim 10, wherein opening the exhaust valve of the dedicated EGR cylinder includes opening the exhaust valve of the dedicated EGR cylinder 120 crank angle degrees after opening the first of the three exhaust valves and closing the exhaust valve of the dedicated EGR cylinder 120 crank angle degrees after opening the second of the three exhaust valves.

12. The method of claim 11, further comprising opening the second of the three exhaust valves 240 crank angle degrees after opening the first of the three exhaust valves.

13. The method of claim 10, wherein operating the three exhaust valves of the three corresponding non-dedicated EGR cylinders to have no exhaust valve opening overlap includes opening each of the three exhaust valves for a same duration over a complete engine cycle, the complete engine cycle including exhaust valve opening of all the three non-dedicated EGR cylinders and the dedicated EGR cylinder.

14. The method of claim 13, wherein opening each of the three exhaust valves for the same duration includes sending exhaust pulses of a same length to a turbine for each exhaust valve opening event, each exhaust pulse occurring consecutively over the complete engine cycle.

15. The method of claim 10, wherein operating the three exhaust valves of the three corresponding non-dedicated EGR cylinders to have no exhaust valve opening overlap includes fully closing one valve of the three exhaust valves before opening another valve of the three exhaust valves such that no two exhaust valves of two different non-dedicated EGR cylinders are open concurrently.

16. The method of claim 10, wherein operating the three exhaust valves of the three corresponding non-dedicated EGR cylinders to have no exhaust valve opening overlap includes simultaneously closing one valve of the three exhaust valves while opening another valve of the three exhaust valves.

17. A system for an engine, comprising:
a crankshaft with four crank pins;
three non-dedicated EGR cylinders routing exhaust to a turbine via a first set of exhaust valves where each of the three non-dedicated EGR cylinders includes one exhaust valve from the first set of exhaust valves;
a single dedicated EGR cylinder routing exhaust to an intake manifold via an exhaust valve of a second set of exhaust valves; and
a controller configured with computer readable instructions for:
operating opening of the first set of exhaust valves to be non-overlapping with one another so that no exhaust valves of the first set of exhaust valves of different cylinders for the three non-dedicated EGR cylinders are open at the same time and operating opening of the exhaust valve of the single dedicated EGR cylinder to overlap with opening of two exhaust valves of the first set of exhaust valves; and
firing, via ignition, the single dedicated EGR cylinder between firing a first non-dedicated EGR cylinder and a second non-dedicated EGR cylinder of the three non-dedicated EGR cylinders and 360 crank angle degrees after firing a third non-dedicated EGR cylinder of the three non-dedicated EGR cylinders.

18. The system of claim 17, wherein the three non-dedicated EGR cylinders have a crankshaft angle firing interval of 240 degrees relative to one another and wherein the single dedicated EGR cylinder has a crankshaft angle firing interval of 120 degrees between the first non-dedicated EGR cylinder and the second non-dedicated EGR cylinder.

19. The system of claim 17, wherein the crankshaft includes a second crank pin, a third crank pin, and a fourth crank pin positioned 120 degrees apart around a centerline of the crankshaft, where the second crank pin is coupled to a piston of the third non-dedicated EGR cylinder.

20. The system of claim 19, wherein the crankshaft further comprises a first crank pin aligned with the second crank pin and coupled to a piston of the single dedicated EGR cylinder and wherein piston strokes of the first crank pin and second crank pin occur 360 crank angle degrees apart.

* * * * *